(12) United States Patent
Koide

(10) Patent No.: US 8,102,850 B2
(45) Date of Patent: Jan. 24, 2012

(54) MULTICAST TREE DESIGN APPARATUS, METHOD, AND PROGRAM PRODUCT

(75) Inventor: Toshio Koide, Tokyo (JP)

(73) Assignee: NEC Corporation, Tokyo (JP)

( * ) Notice: Subject to any disclaimer, the term of this patent is extended or adjusted under 35 U.S.C. 154(b) by 135 days.

(21) Appl. No.: 12/450,942

(22) PCT Filed: Apr. 21, 2008

(86) PCT No.: PCT/JP2008/057669
§ 371 (c)(1),
(2), (4) Date: Oct. 19, 2009

(87) PCT Pub. No.: WO2008/133230
PCT Pub. Date: Nov. 6, 2008

(65) Prior Publication Data
US 2010/0118738 A1 May 13, 2010

(30) Foreign Application Priority Data

Apr. 20, 2007 (JP) ................................. 2007-111456

(51) Int. Cl.
*H04L 12/28* (2006.01)
(52) U.S. Cl. ...................................... 370/390; 370/256
(58) Field of Classification Search .................. 370/254, 370/236, 390; 709/238
See application file for complete search history.

(56) References Cited

U.S. PATENT DOCUMENTS 6,141,318 A 10/2000 Miyao
(Continued)

FOREIGN PATENT DOCUMENTS

EP 1515495 A2 * 3/2005
(Continued)

OTHER PUBLICATIONS

Zhu, et al., "A Source-Based Algorithm for Delay-Constrained Minimum-Cost Multicasting", Fourteenth Annual Joint Conference of the IEEE Computer and Communications Societies, vol. 1, 1995, pp. 377-385.

(Continued)

*Primary Examiner* — Phirin Sam
(74) *Attorney, Agent, or Firm* — McGinn IP Law Group, PLLC

(57) ABSTRACT

A multicast tree design apparatus designs a multicast tree by mathematical programming. The multicast tree design apparatus is one for designing a multicast tree for transferring a packet from a source node to a plurality of destination nodes on a network that includes nodes and links connecting the nodes, the apparatus including a problem creating unit and a problem solving unit, and wherein: the problem creating unit includes a multiple route constraint creating unit for creating constraint expressions for constructing a plurality of routes that start from a source node and end at a plurality of destination nodes, a tree constraint creating unit for creating a constraint expression for superposing all the routes to construct a multicast tree, a confluence constraint creating unit for creating a constraint expression for preventing the plurality of routes from being superposed into a topology that causes a confluence of the routes, and an objective function creating unit for creating an objective function for minimizing an evaluation index pertaining to the links or the nodes that constitute the multicast tree; and the problem solving unit solves a mathematical programming problem including the constraint expressions and the objective function created by the problem creating unit to determine a set of links that constitute the multicast tree.

30 Claims, 6 Drawing Sheets

U.S. PATENT DOCUMENTS

| | | | |
|---|---|---|---|
| 6,252,856 B1 * | 6/2001 | Zhang | 370/254 |
| 6,404,744 B1 | 6/2002 | Saito | |
| 7,006,488 B1 | 2/2006 | Saito | |
| 7,031,308 B2 * | 4/2006 | Garcia-Luna-Aceves et al. | 370/390 |
| 7,035,217 B1 * | 4/2006 | Vicisano et al. | 370/236 |
| 2002/0040287 A1 | 4/2002 | Saito | |
| 2003/0005149 A1 * | 1/2003 | Haas et al. | 709/238 |
| 2003/0097643 A1 | 5/2003 | Saito | |
| 2004/0196795 A1 * | 10/2004 | Yang | 370/254 |
| 2004/0258066 A1 * | 12/2004 | Chen et al. | 370/390 |
| 2006/0221962 A1 * | 10/2006 | Previdi et al. | 370/390 |
| 2007/0286093 A1 * | 12/2007 | Cai et al. | 370/254 |
| 2008/0008098 A1 | 1/2008 | Saito | |
| 2008/0069100 A1 * | 3/2008 | Weyman et al. | 370/390 |

FOREIGN PATENT DOCUMENTS

| | | |
|---|---|---|
| JP | 11-127151 | 5/1999 |
| JP | 11-215124 | 8/1999 |
| JP | 2000-22750 | 1/2000 |
| JP | 3141808 | 12/2000 |
| JP | 2001-36574 | 2/2001 |
| JP | 2002-57676 | 2/2002 |
| JP | 2003-152777 | 5/2003 |
| JP | 2004-208289 | 7/2004 |
| JP | 2004-260719 | 9/2004 |
| JP | 2005-72869 | 3/2005 |
| JP | 2005-244526 | 9/2005 |
| JP | 3782063 | 3/2006 |
| JP | 2007-6228 | 1/2007 |

OTHER PUBLICATIONS

Sugisono, et al., "Kosoku na Cost Sakugen Multicase Keiro Keisanho no Kento", IEICE Technical Report, Nov. 20, 2003, vol. 103, No. 442, pp. 51-54, NS2003-156, "3. Teian Algorithm".

* cited by examiner

MULTICAST TREE DESIGN APPARATUS, METHOD, AND PROGRAM PRODUCT

TECHNICAL FIELD

The present invention relates to an apparatus and method for designing a multicast tree for transferring a packet from a source node to a plurality of destination nodes on a network that includes nodes and links.

BACKGROUND ART

Conventional apparatuses of this type include a multicast tree design apparatus that designs a multicast tree by using Dijkstra's algorithm. Dijkstra's algorithm is an algorithm for selecting a route that minimizes a defined cost. Dijkstra's algorithm has been suitably used to design a multicast tree so as to minimize the link cost from a source node to a plurality of destination nodes.

There has been proposed an apparatus that designs a multicast tree in a mixed network of nodes having a multicast forwarding function and nodes having only a unicast forwarding function. Using an improved Dijkstra's algorithm, the apparatus designs a multicast tree so as to reduce the link cost from a source node to a plurality of destination nodes as well as to prevent the occurrence of branching at the nodes that only have a unicast function (for example, see PTL 1).

Methods for designing optimum paths in a communication network by using mathematical programming have also been known. For example, according to a design method described in PTL 2, a route control apparatus develops the path allocation scheme of an arbitrary network configuration along the framework of linear programming, and applies various types of linear programming solutions to determine path allocations, flow bandwidths, and objective function values for comparative evaluation. A method of designing a network that consists of node-connecting links by mathematical programming has been shown, for example, in PTL 3.

{Citation List}
{Patent Literature}
{PTL 1} JP-A-2007-6228
{PTL 2} JP-B-3782063
{PTL 3} JP-B-3141808

SUMMARY OF INVENTION

Technical Problem

Multicast tree design apparatuses based on Dijkstra's algorithm entail designing a complicated algorithm according to the optimization purpose. For example, in PTL 1, the basic Dijkstra's algorithm is improved so as to prevent the occurrence of branching at nodes that only have a unicast function. Thus, n types of algorithms need to be designed for n types of optimization purposes as long as based on Dijkstra's algorithm. This typically increases the development cost, and the designed algorithms consume a lot of time and labor to verify.

In the network design by mathematical programming, on the other hand, the mathematical programming problem to be created differs depending on the optimization purpose. Once the mathematical programming problem is successfully created, it is possible to solve the mathematical programming problem by simply utilizing existing solution algorithms. This allows a significant reduction in development cost and verification time. What type of mathematical programming problem is effective at designing a multicast tree, however, is not obvious. In fact, there is no known case where mathematical programming problems are applied to multicast tree design.

An object of the present invention is to provide a new multicast tree design apparatus and method for designing a multicast tree by mathematical programming.

Solution to Problem

According to the present invention, there is provided a multicast tree design apparatus for designing a multicast tree for transferring a packet from a source node to a plurality of destination nodes on a network that includes nodes and links connecting the nodes, the apparatus including a problem creating unit and a problem solving unit, and wherein: the problem creating unit includes a multiple route constraint creating unit for creating constraint expressions for constructing a plurality of routes that start from a source node and end at a plurality of destination nodes, a tree constraint creating unit for creating a constraint expression for superposing all the routes to construct a multicast tree, a confluence constraint creating unit for creating a constraint expression for preventing the plurality of routes from being superposed into a topology that causes a confluence of the routes, and an objective function creating unit for creating an objective function for minimizing an evaluation index pertaining to the links or the nodes that constitute the multicast tree; and the problem solving unit solves a mathematical programming problem including the constraint expressions and the objective function created by the problem creating unit to determine a set of links that constitute the multicast tree.

According to the present invention, there is also provided a multicast tree design method for designing a multicast tree for transferring a packet from a source node to a plurality of destination nodes on a network that includes nodes and links connecting the nodes, the method including: a problem creating step of creating constraint expressions for constructing a plurality of routes that start from a source node and end at a plurality of destination nodes, a constraint expression for superposing all the routes to construct a multicast tree, a constraint expression for preventing the plurality of routes from being superposed into a topology that causes a confluence of the routes, and an objective function for minimizing an evaluation index pertaining to the links or the nodes that constitute the multicast tree; and a problem solving step of solving a mathematical programming problem including the constraint expressions and the objective function created by the problem creating step to determine a set of links that constitute the multicast tree.

According to the present invention, there is further provided a program product, embodied on a computer readable medium, for designing, by using a computer, a multicast tree for transferring a packet from a source node to a plurality of destination nodes on a network that includes nodes and links connecting the nodes, the program product comprising codes that, when executed, making the computer to perform: a problem creating step of creating constraint expressions for constructing a plurality of routes that start from a source node and end at a plurality of destination nodes, a constraint expression for superposing all the routes to construct a multicast tree, a constraint expression for preventing the plurality of routes from being superposed into a topology that causes a confluence of the routes, and an objective function for minimizing an evaluation index pertaining to the links or the nodes that constitute the multicast tree; and a problem solving step of solving a mathematical programming problem including the constraint expressions and the objective function created by the problem creating step to determine a set of links that constitute the multicast tree.

Advantageous Effects of Invention

According to the present invention, a multicast tree is designed by mathematical programming. This eliminates the need for developing complicated algorithms for respective optimization purposes as with a multicast tree design apparatus that is based on Dijkstra's algorithm.

DESCRIPTION OF EMBODIMENTS

Hereinafter, a best mode for carrying out the present invention will be described in detail with reference to the drawings.

First Embodiment

Figure 1:
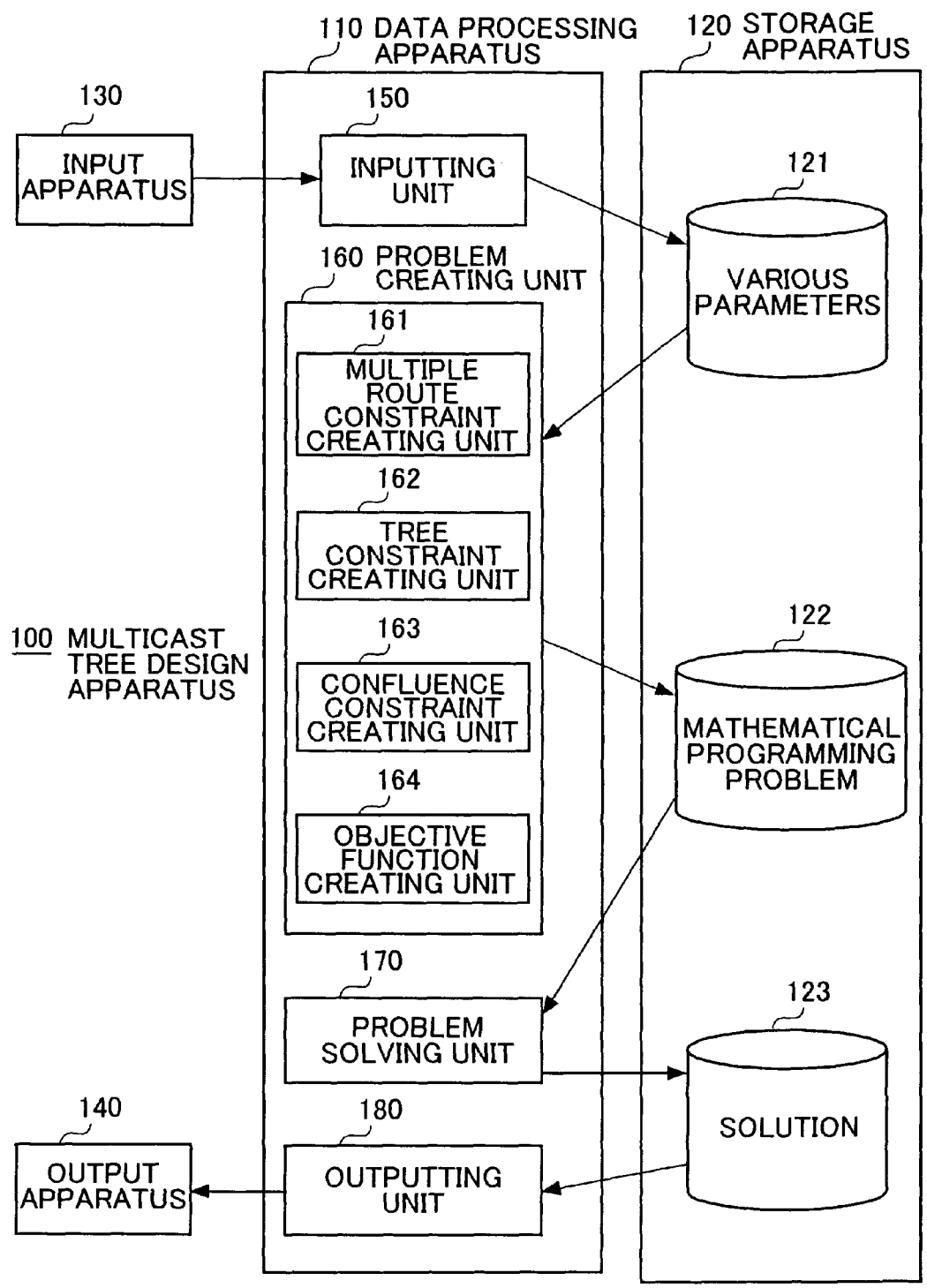
FIG. 1 A block diagram of a multicast tree design apparatus according to a first embodiment of the present invention.

Referring to FIG. 1, a multicast tree design apparatus 100 according to the first embodiment of the present invention includes a data processing apparatus 110, a storage apparatus 120, an input apparatus 130, and an output apparatus 140.

The input apparatus 130 is an apparatus for inputting various types of parameters necessary to design a multicast tree. The input apparatus 130 includes a keyboard, file device, and data receiving device, for example.

The output apparatus 140 is an apparatus for outputting a multicast tree designed. The output apparatus 140 includes a display, file device, and data transmission device, for example.

The storage apparatus 120 is an apparatus that stores various types of parameters input from the input apparatus 130 and data under processing. The storage apparatus 120 includes a semiconductor memory and a magnetic disk, for example.

The data processing apparatus 110 is an apparatus that creates a mathematical programming problem based on various types of parameters input from the input apparatus 130 and solves the mathematical programming problem to derive a multicast tree. In the present embodiment, the data processing apparatus 110 includes an inputting unit 150, a problem creating unit 160, a problem solving unit 170, and an outputting unit 180. The problem creating unit 160 includes a multiple route constraint creating unit 161, a tree constraint creating unit 162, a confluence constraint creating unit 163, and an objective function creating unit 164. These units generally have the following functions.

The inputting unit 150 inputs various types of parameters necessary to design a multicast tree from the input apparatus 130, and stores the parameters in the storage apparatus 120 as various parameters 121.

The problem creating unit 160 reads the various parameters 121 from the storage apparatus 120, creates a mathematical programming problem for designing a multicast tree, and stores the resultant in the storage apparatus 120 as a mathematical programming problem 122. Specifically, the multiple route constraint creating unit 161 creates constraint expressions for constructing a plurality of routes that start from a source node and end at a plurality of destination nodes. The tree constraint creating unit 162 creates a constraint expression for superposing all the routes into a multicast tree. The confluence constraint creating unit 163 creates a constraint expression for preventing the plurality of routes from being superposed into a topology that causes a confluence of the routes. The objective function creating unit 164 creates an objective function for minimizing an evaluation index pertaining to the links or nodes that constitute the multicast tree. The constraint expressions and the objective function created by the problem creating unit 160 constitute a mathematical programming problem.

The problem solving unit 170 reads the mathematical programming problem 122 composed of the constraint expressions and the objective function from the storage apparatus 120, solves the mathematical programming problem 122 to determine a set of links that construct a multicast tree, and stores the set of links in the storage apparatus 120 as a solution 123.

The outputting means 180 reads the solution 123 from the storage apparatus 120, and simply outputs the solution 123 or converts it into a predetermined data format before outputting the resultant from the output apparatus 140.

Next, the operation of the present embodiment will be described with reference to the block diagram of FIG. 1 and the flowchart of FIG. 2.

Figure 3:
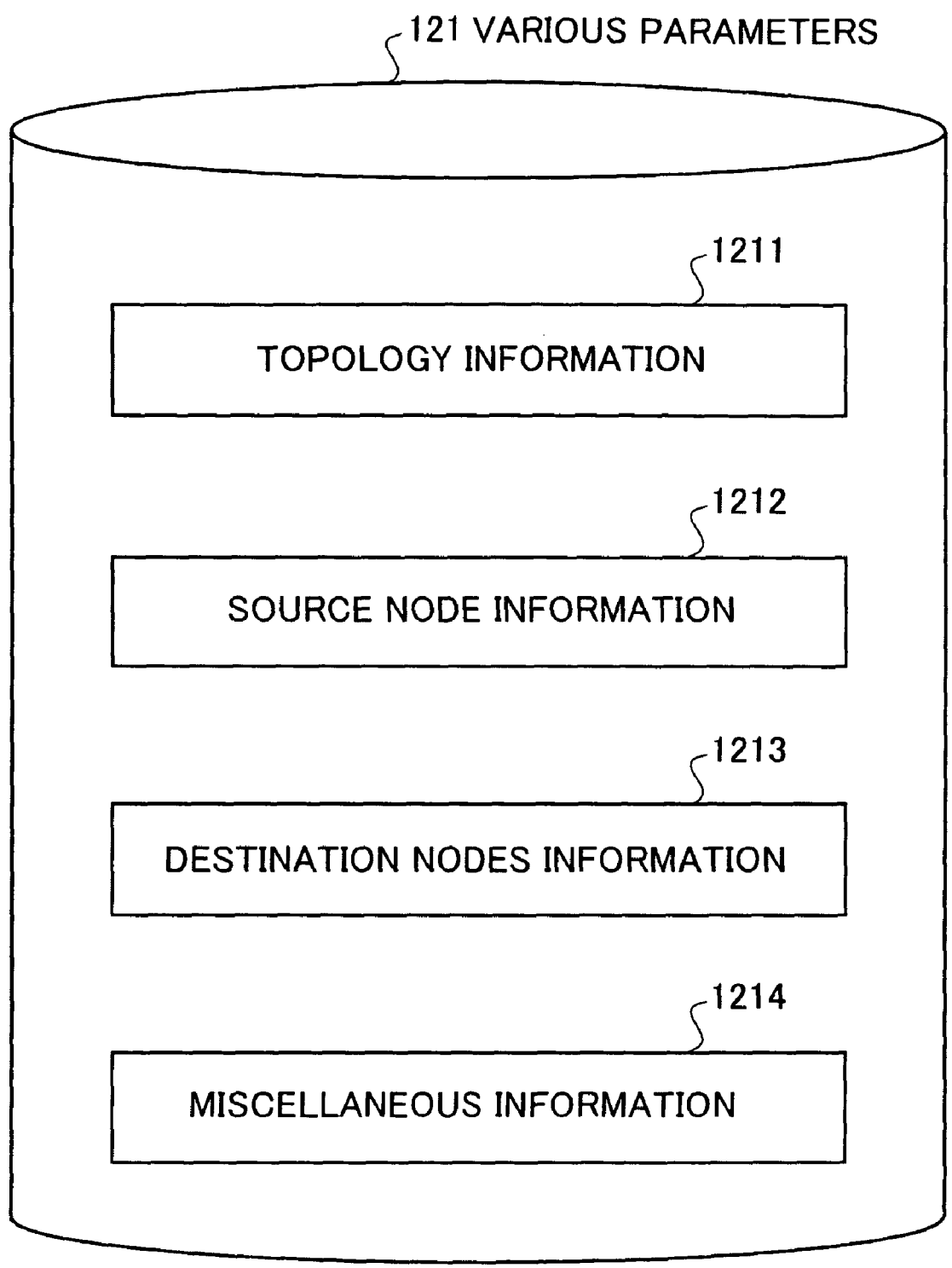
FIG. 3 An explanatory diagram of various parameters to be input to the multicast tree design apparatus according to the first embodiment of the present invention.

Initially, the inputting unit 150 of the data processing apparatus 110 inputs various types of parameters necessary to design a multicast tree from the input apparatus 130, and stores the parameters in the storage apparatus 120 as various parameters 121 (S101). Referring to FIG. 3, the various parameters 121 include topology information 1211, source node information 1212, destination nodes information 1213, and miscellaneous information 1214.

The topology information 1211 is information for defining the topology of the network for the multicast tree to be constructed of. More specifically, the topology information 1211 specifies connections between nodes and links. The nodes and links included in the network are given unique node numbers and link numbers, respectively. Such numbers are used to define the connections between the nodes and the links.

The source node information 1212 includes the node number of the node to be the source node. The destination nodes information 1213 includes the node numbers of the nodes to be the destination nodes.

The miscellaneous information 1214 includes the delays and bandwidths of the respective links, for example. What kind of information the miscellaneous information 1214 should include typically differs depending on the types of the constraint expressions and objective function.

Next, the problem creating unit 160 reads the various parameters 121 from the storage apparatus 120, creates a mathematical programming problem for determining a multicast tree, and stores the mathematical programming problem in the storage apparatus 120 (S102 to S105). Specifically, the problem creating unit 160 creates the mathematical programming problem by the following procedure.

Initially, the multiple route constraint creating unit 161 creates constraint expressions for constructing a plurality of routes that start from a source node s and end at a plurality of destination nodes z (S102). The reason of the creation of such constraint expressions is to ensure the presence of the routes from the source node s to the respective destination nodes z.

Specifically, the multiple route constraint creating unit 161 creates a constraint expression shown in Exp. 1 for the source node s, creates constraint expressions shown in Exp. 2 for the plurality of destination nodes z, and creates a constraint expression shown in Exp. 3 for transit nodes i:

{Exp. 1}

$$\sum_{e_{s,j} \in E^+(s)} x_{s,j}^z = 1 \quad (1)$$

$$(\forall z \in Z)$$

{Exp. 2}

$$\sum_{e_{j,z} \in E^-(z)} x_{j,z}^z = 1 \quad (2)$$

$$\sum_{e_{z,j} \in E^+(z)} x_{z,j}^z = 0$$

$$(\forall z \in Z)$$

For nodes i excluding the start point s and end points z,

{Exp. 3}

$$\sum_{e_{j,i} \in E^-(i)} x_{j,i}^z - \sum_{e_{i,k} \in E^+(i)} x_{i,k}^z = 0 \quad (3)$$

$$(\forall z \in Z)$$

Here, $x_{i,j}^z$ is a 0-1 variable that indicates whether a route that starts from the source node s and ends at a certain destination node z passes through the link from node i to node j. For example, $x_{i,j}^z=1$ indicates that the route passes through the link from node i to node j, and $x_{i,j}^z=0$ indicates not. Z represents the set of destination nodes, $e_{i,j}$ the link from node i to node j, $E^-(i)$ a set of all links that end at node i, and $E^+(i)$ a set of all links that start from node i.

Exp. 1 means that the route that starts from the source node s and ends at the destination node z passes through only one of the links that are directly connected to the source node s. Exp. 2 means that the route that starts from the source node s and ends at the destination node z passes through only one of the links that are directly connected to the destination node z (the former one of expression 1), and none of the links starts from the destination node z (the latter one of expression 2). Exp. 3 means that, for each destination node z, there is always a link that starts from node i if the route enters the node i, and there is always no link that starts from node i if the route does not enter the node i.

Next, the tree constraint creating unit 162 creates a constraint expression for superposing all the plurality of routes that start from the source node s and end at the plurality of destination nodes z into a multicast tree (S103). The reason for the creation of such a constraint expression is that if there is no such constraint expression, the plurality of routes that start from the source node s and end at the plurality of destination nodes z are included in the solution as respective independent routes, failing to provide the topology of a multicast tree.

Specifically, the tree constraint creating unit 162 creates a constraint expressions shown in Exp. 4 for each link in the network:

{Exp. 4}

$$|Z|x_{i,j} \geq \sum_{z \in Z} x_{i,j}^z \geq x_{i,j} \quad (4)$$

$$(\forall e_{i,j} \in E)$$

Here, E represents a set of all the links in the network. $X_{i,j}$ is a 0-1 variable that indicates if there is any route that passes through the link from node i to node j when all the routes are superposed. For example, $x_{i,j}=1$ indicates that there is a route that passes through the link from node i to node j, and $x_{i,j}=0$ indicates not. $X_{i,j}$ is a similar symbol to $x_{i,j}^z$ with a superscript z, but has totally different meaning.

Exp. 4 means that the variable $x_{i,j}$, which indicates if there is any route that passes through the link from node i to node j when the routes are superposed, needs to be created so that the total number of routes that start from the source node s, end at the destination nodes z, and pass through the link from node i to node j satisfies being less than or equal to $Zx_{i,j}$ and being greater than or equal to $x_{i,j}$. From the constraint expression, $x_{i,j}=1$ if there are one or more but not more than Z routes that start from the source node s, end at the destination nodes z, and pass through the link from node i to node j, while $x_{i,j}=0$ if there is no route at all that starts from the source node s, ends at a destination node z, and passes through the link from node i to node j.

Next, the confluence constraint creating unit 163 creates a constraint expression for preventing the plurality of routes that start from the source node s and end at the plurality of destination nodes z from being superposed into a topology that causes a confluence of the routes (S104). The reason for the creation of such a constraint expression is that if there is no such constraint expression, confluent routes can be included in the solution, failing to provide a tree structure.

Specifically, the confluence constraint creating unit 163 creates a constraint expression shown in Exp. 5 for each node i:

{Exp. 5}

$$\sum_{e_{j,i} \in E^-(i)} x_{j,i} \leq 1 \quad (5)$$

Exp. 5 means that a set of all links that end at node i includes at most one of the links of the multicast tree.

Next, the objective function creating unit 164 creates an objective function for minimizing an evaluation index pertaining to the links or nodes that constitute the multicast tree (S105). The objective function to be created differs depending on the optimization purpose. Hereinafter, several examples of the optimization purpose will be given along with respective corresponding objective functions.

(1) Optimization purpose: to minimize the total sum of delays from the source node to the destination nodes In such a case, the objective function creating unit 164 assumes the total sum of the delays of the respective routes as the objective function. Specifically, the objective function creating unit 164 applies the minimization of the objective function shown in Exp. 6:

{Exp. 6}

$$\sum_{z \in Z} \sum_{e_{i,j} \in E} d_{i,j} x_{i,j}^2 \qquad (6)$$

Here, $d_{i,j}$ is the delay of the link from node i to node j, which is given by the miscellaneous information 1214 in the various parameters 121. Exp. 6 represents the total sum of the delays of the respective routes.

(2) Optimization purpose: to minimize the number of transit nodes In such a case, the objective function creating unit 164 assumes the total number of links that constitute the multicast tree as the objective function. Specifically, the objective function creating unit 164 applies the minimization of the objective function shown in Exp. 7:

{Exp. 7}

$$\sum_{e_{i,j} \in E} x_{i,j} \qquad (7)$$

Exp. 7 represents the total number of links in the multicast tree.

(3) Optimization purpose: to maximize the surplus bandwidth of the links Maximizing a surplus bandwidth is equivalent to defining the reciprocals of the bandwidths of the respective links as penalties and minimizing the maximum value of the penalties. For the objective function, the objective function creating unit 164 therefore assumes the maximum value of the reciprocals of the bandwidths of the respective links on the plurality of routes that start from the source node s and end at the plurality of destination nodes z.

Specifically, the objective function creating unit 164 applies the minimization of the objective function shown in Exp. 8:

{Exp. 8}

$$\max\left\{\frac{1}{b_1} x_1, \frac{1}{b_2} x_2 \ldots, \frac{1}{b_n} x_n\right\} \qquad (8)$$

Here, $b_i$ is a constant that indicates the bandwidth of link i, which is given by the miscellaneous information 1214 in the various parameters 121. Exp. 8 represents the maximum value of the reciprocals of the bandwidths of the respective links that constitute the multicast tree.

Objective functions for use in the present invention are not limited to the foregoing. The foregoing functions may be used in combination. A function of objective functions, such as the product of objective functions, may be used.

The problem creating unit 160 stores the constraint expressions created at steps S102 to S104 and the objective function created at step S105 into the storage apparatus 120 as a mathematical programming problem 122. It should be appreciated that steps S102 to S105 need not necessarily be performed in the order shown in the flowchart, and may be in arbitrary order.

Next, description will be given of the operation of the problem solving unit 170. The problem solving unit 170 reads the mathematical programming problem 122 composed of the constraint expressions and objective function from the storage apparatus 120, and solves the mathematical programming problem 122 by referring to the various parameters 121 if necessary (S106). Various solution algorithms for mathematical programming problems have heretofore been proposed, including a simplex method, projective transformation method, and interior method. From among such methods, an appropriate one may be selected for use.

The solution 123 of the mathematical programming problem 122 solved by the problem solving unit 170 is stored in the storage apparatus 120. The solution 123 includes the values of the variables $x_{i,j}$ that are obtained by solving the mathematical programming problem 122.

Next, the outputting unit 180 reads the solution 123 from the storage apparatus 120, and outputs the solution 123 from the outputting apparatus 140 as the resulting design of a multicast tree (S107). The variables $x_{i,j}$ included in the solution 123 indicate whether or not the corresponding links are included in the multicast tree. The outputting unit 180 therefore outputs a multicast tree that is defined by a set of variables $x_{i,j}$ having a value of 1 as the result. For output, the outputting unit 180 may apply conversion processing into a data format suited to an apparatus that actually sets the multicast tree to the network.

Next, the effects of the present embodiment will be described.

According to the present embodiment, the problem creating unit 160 creates a mathematical programming problem which includes: constraint expressions for constructing a plurality of routes that start from a source node s and end at a plurality of destination nodes z; a constraint expression for superposing all the routes into a multicast tree; a constraint expression for preventing the plurality of routes from being superposed into a topology that causes a confluence of the routes; and an objective function for minimizing an evaluation index pertaining to the links or nodes that constitute the multicast tree. The problem solving unit 170 solves the mathematical programming problem to determine a set of links that constitutes the multicast tree. Consequently, when topology information on the network and information on the source node s, the destination nodes z, and the like are given, it is possible to design a multicast tree for transferring a packet from the source node s to the plurality of destination nodes z by mathematical programming.

According to the present embodiment, the mathematical programming problem is solved with consideration given to the routes that start from the source node s and end at the respective destination nodes z. As compared to methods of designing a multicast tree without regard to such routes, it is therefore possible to impose independent constraints and perform optimization on each individual route. In this respect, description will be added below.

Another possible method to design a multicast tree for transferring a packet from a source node s to a plurality of destination nodes z by mathematical programming is to solve a mathematical programming problem that minimizes an objective function shown below in Exp. 9 under constraint expressions shown in Exp. 10, 11, and 12:

Minimize

{Exp. 9}

$$\sum_{e_{i,j} \in E} x_{i,j} \qquad (9)$$

Subject to:
For the start point s,

{Exp. 10}

$$\sum_{e_{i,j} \in E^+(s)} x_{s,j} \geq 1 \qquad (10)$$

For each end point z,

{Exp. 11}

$$\sum_{e_{i,z} \in E^-(s)} x_{i,z} \geq 1 \qquad (11)$$

For nodes i excluding the start point s and end points z,

{Exp. 12}

$$K \sum_{e_{j,i} \in E^-(i)} x_{j,i} \geq \sum_{e_{i,k} \in E^+(i)} x_{i,k} \geq \sum_{e_{j,i} \in E^-(i)} x_{j,i} \qquad (12)$$

where K is the maximum allowable number of branches.

As can be seen from the absence of the superscript z on the variable x in Exps. 9 to 12, such a mathematical programming problem does not take any account of the routes that start from the source node s and end at the respective source nodes z. Consequently, optimization is possible with such an objective function as shown in Exp. 9, whereas it is difficult to perform such optimization as minimizes the total sum of delays pertaining to the routes from the source node to the destination nodes like shown in Exp. 6 of the present embodiment.

According to the present embodiment, it is also possible to impose independent constraints on each of the routes from the source node to the respective destination nodes so as to pass through a designated link or so as to suppress the delay of the route not to exceed a certain value.

Second Embodiment

Figure 4:
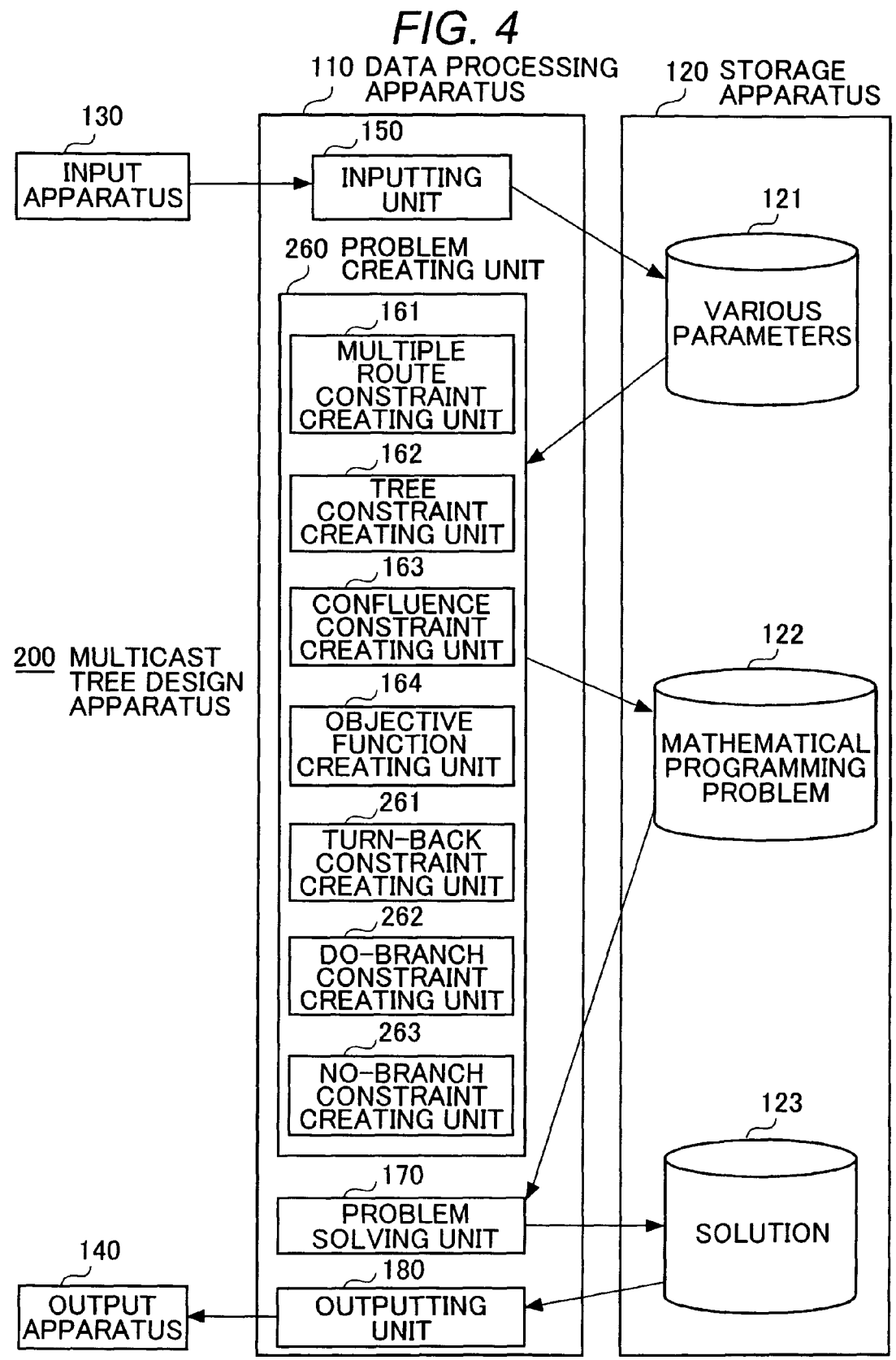
FIG. 4 A block diagram of a multicast tree design apparatus according to a second embodiment of the present invention.

Referring to FIG. 4, a multicast tree design apparatus 200 according to a second embodiment of the present invention differs from the multicast tree design apparatus 100 of the first embodiment illustrated in FIG. 1 in that a problem creating unit 260 is included instead of the problem creating unit 160.

The problem creating unit 260 includes the same multiple route constraint creating unit 161, tree constraint creating unit 162, confluence constraint creating unit 163, and objective function creating unit 164 as those of the problem creating unit 160, as well as a turn-back constraint creating unit 261, a do-branch constraint creating unit 262, and a no-branch constraint creating unit 263. While the present embodiment deals with the case where the three new constraint creating units are added, other possible embodiments may include any one or two of the turn-back constraint creating unit 261, do-branch constraint creating unit 262, and no-branch constraint creating unit 263. These unit generally have the following functions.

The turn-back constraint creating unit 261 creates a constraint expression for preventing the plurality of routes that start from the source node and end at the plurality of destination nodes from turning back to and passing through a node that has already been passed.

The do-branch constraint creating unit 262 creates constraint expressions for ensuring that the multicast tree branches at one or more nodes.

The no-branch constraint creating unit 263 creates a constraint expression for preventing the multicast tree from branching at one or more nodes.

The problem creating unit 260 stores a mathematical programming problem which is composed of the constraint expressions created by the multiple route constraint creating unit 161, tree constraint creating mean 162, confluence constraint creating unit 163, turn-back constraint creating unit 261, do-branch constraint creating unit 262, and no-branch constraint creating unit 263, and the objective function created by the objective function creating unit 164 into the storage apparatus 120 as a mathematical programming problem 122.

Figure 5:
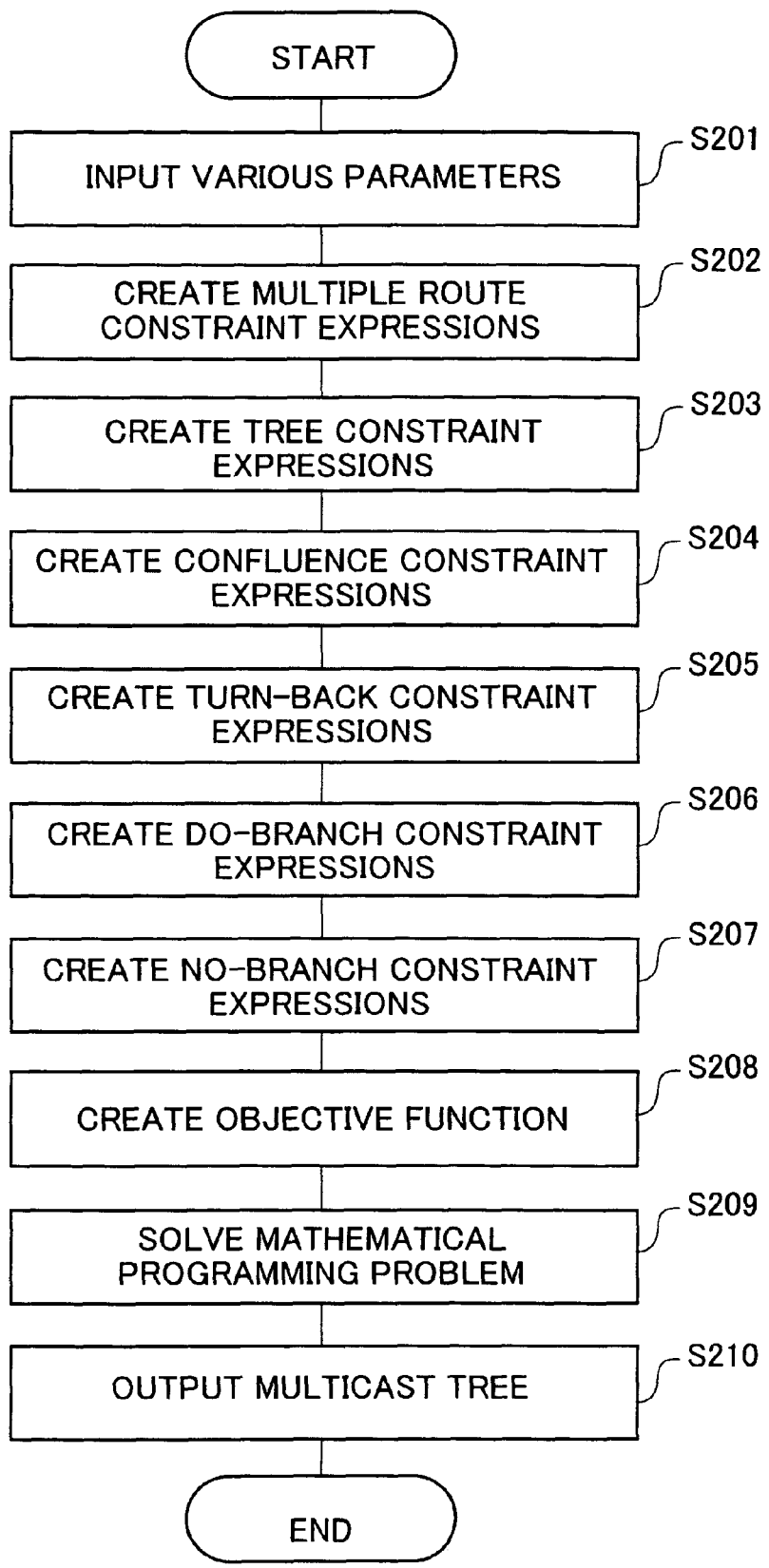
FIG. 5 A flowchart illustrating an example of processing of the multicast tree design apparatus according to the second embodiment of the present invention.

Next, the operation of the present embodiment will be described with reference to the block diagram of FIG. 4 and the flowchart of FIG. 5.

Figure 2:
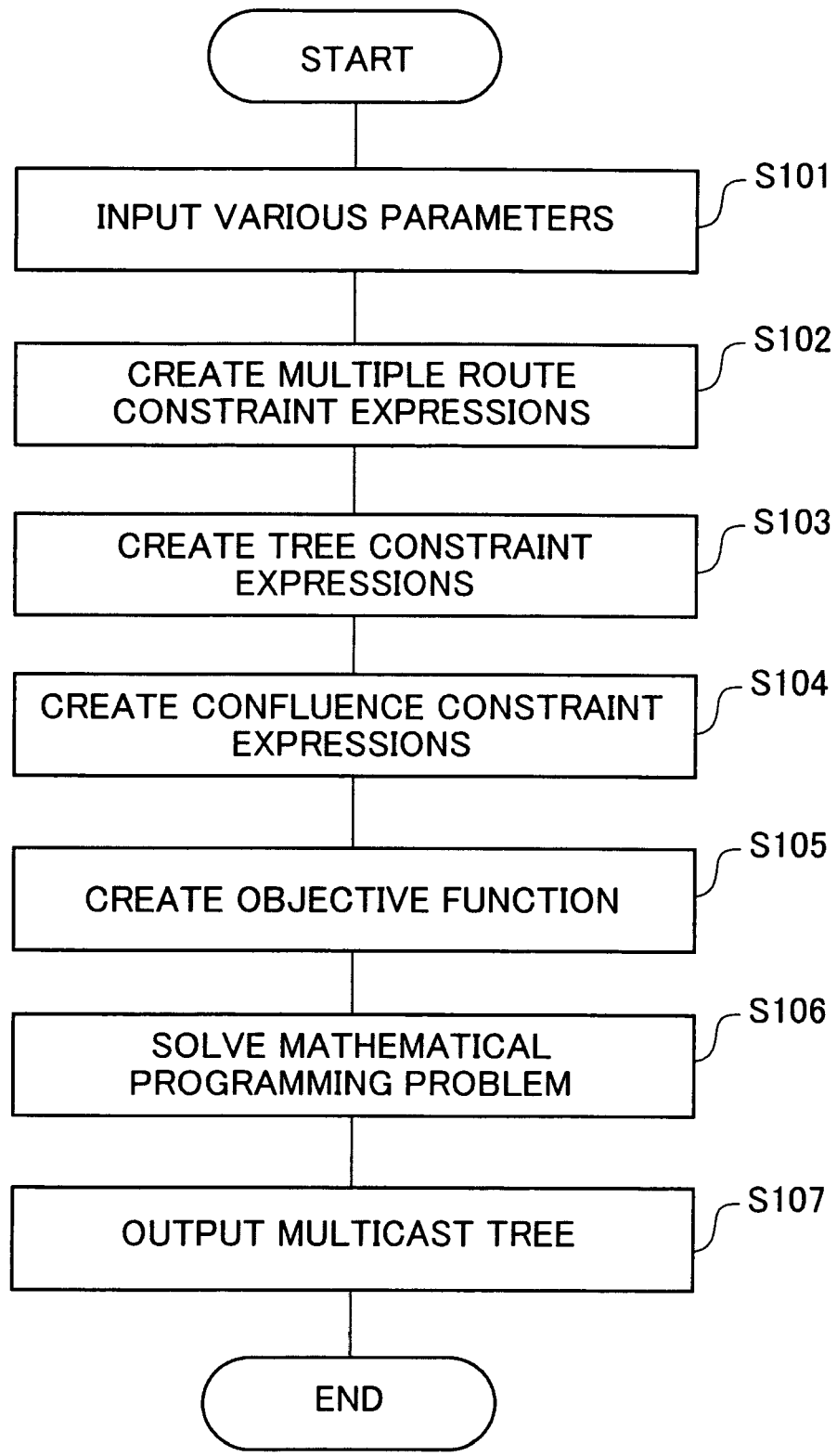
FIG. 2 A flowchart illustrating an example of processing of the multicast tree design apparatus according to the first embodiment of the present invention.

The data processing apparatus 110 initially executes steps S201 to 5204 to perform the same processing as that of steps S101 to 104 in FIG. 2, the flowchart of the first embodiment. The data processing apparatus 110 thereby inputs various types of parameters necessary to design a multicast tree from the input apparatus 130, and stores the parameters in the storage apparatus 120 as various parameters 121. The data processing apparatus 110 also creates constraint expressions for constructing a plurality of routes that start from a source node s and a plurality of destination nodes z (Exps. 1 to 3), constraint expressions for superposing all the routes into a multicast tree (Exp. 4), and a constraint expression for preventing the plurality of routes from being superposed into a topology that causes a confluence of the routes (Exp. 5).

The turn-back constraint creating unit 261 of the problem creating unit 260 creates constraint expressions for preventing the plurality of routes that start from the source node s and end at the plurality of destination nodes z from turning back to and passing through a node that has already been passed (S205). The reason for the creation of such constraint expressions is that if there is no such constraint expressions, the solution may include a route that turns back to a once-passed node to reach a different node; such routes are obviously redundant and are thus rejected. Instead of using such constraint expressions, the resulting solution of a multicast tree may be inspected so that another solution can be recalculated if there is any route that turns back to a node that has been passed immediately before. Note that the use of such constraint expressions is not capable of removing loop structures that return to once-passed nodes via other nodes. If the solution is found to include any loop structure, it is desirable to recalculate for a different solution.

Specifically, the turn-back constraint creating unit 261 creates constraint expressions shown in Exp. 13 for all the links:

{Exp. 13}

$$x_{i,j} + x_{j,i} \leq 1 (\forall e_{i,j} \in E) \qquad (13)$$

Exp. 13 means that, for each of the links that constitute the multicast tree, a link leading from node i to node j and a link leading from node j to node i do not exist simultaneously.

Next, the do-branch constraint creating unit 262 creates constraint expressions for ensuring that the multicast tree branches at one or more nodes (S206). The reason for the creation of such constraint expressions is that if the network includes a high-performance router (node), it is sometimes desirable to make positive use of the node to copy packets for branching.

Specifically, if the multicast tree is intended to branch at every node included in an arbitrary set of nodes I, the do-branch constraint creating unit 262 creates constraint expressions shown in Exps. 14 and 15:

{Exp. 14}

$$\sum_{e_{j,i} \in E^-(i)} x_{j,i} = 1 \quad (14)$$

$$(\forall i \in I)$$

{Exp. 15}

$$2 \leq \sum_{e_{i,j} \in E^+(i)} x_{i,j} \quad (15)$$

$$(\forall i \in I)$$

Here, the set of nodes I is given by the miscellaneous information 1214 in the various parameters 121. Exp. 14 means that the multicast tree always passes through node i. Exp. 15 means that the multicast tree always branches at node i.

Now, if the multicast tree is intended to branch at least one of the nodes included in an arbitrary set of nodes I, the do-branch constraint creating unit 262 creates constraint expressions shown in Exp. 16:

{Exp. 16}

$$2y_i \leq \sum_{e_{i,j} \in E^+(i)} x_{i,j} \quad (16)$$

$$(\forall i \in I)$$

$$\sum_{i \in I} y_i \geq 1$$

The first expression in Exp. 16 means that if a variable $y_i$ is 1, the multicast tree always branches at node i. The second expression means that at least one of $y_i$'s corresponding to nodes i included in the set of nodes I is 1.

Next, the no-branch constraint creating unit 263 creates a constraint expression for preventing the multicast tree from branching at one or more nodes (S207). The reason for the creation of such a constraint expression is that if the network includes a router (node) having no multicast function, branching at that node needs to be avoided.

Specifically, if branching is inhibited at every node i included in an arbitrary set of nodes I, the no-branch constraint creating unit 263 creates a constraint expression shown in Exp. 17:

{Exp. 17}

$$\sum_{e_{j,i} \in E^-(i)} x_{j,i} - \sum_{e_{i,j} \in E^+(i)} x_{i,j} = 0 \quad (17)$$

$$(\forall i \in I)$$

Exp. 17 means that the number of links output from node i is always one if there is a link input to node i. Here, the set of nodes i for branching to be inhibited at is given by the miscellaneous information 1214 in the various parameters 121.

Next, the objective function creating unit 164 creates an objective function for minimizing an evaluation index pertaining to the links or nodes that constitute the multicast tree (S208) as in the first embodiment.

The problem creating unit 260 stores the constraint expressions created at steps S202 to S207 and the objective function created at step S208 into the storage apparatus 120 as a mathematical programming problem 122. It should be appreciated that steps 5202 to S208 need not necessarily be performed in the order shown in the flowchart, and may be in arbitrary order.

Subsequently, as in the first embodiment, the problem solving unit 170 solves the mathematical programming problem 122 (S209), and the outputting unit 180 outputs the resulting design of a multicast tree from the output apparatus 140 based on the solution 123.

Next, the effects of the present embodiment will be described.

According to the present embodiment, the following effects are obtained aside from the same effects as those of the first embodiment.

With the turn-back constraint creating unit 261, it is possible to reject redundant routes that turn back to a once-passed node to reach a different node.

With the do-branch constraint creating unit 262, it is possible to design the multicast tree so as to branch by making positive use of a high-performance router (node) to copy packets if the network includes such a node.

With the no-branch constraint creating unit 263, it is possible to design the multicast tree so as not to branch at a router (node) that has no multicast function or but with low performance if the network includes such a node.

Other Embodiments

Figure 6:
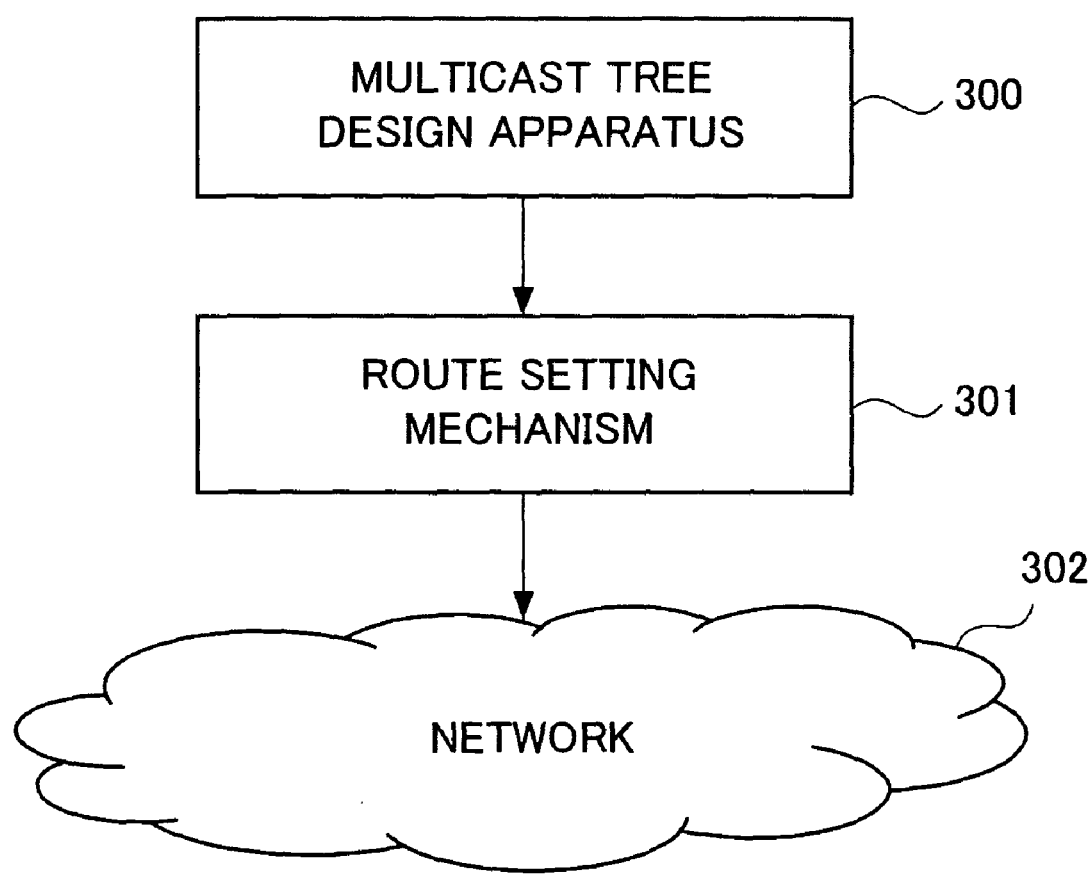
FIG. 6 A block diagram of another embodiment of the present invention.

The foregoing embodiments have dealt with the cases where the output apparatus 140 such as a display is included. Nevertheless, as illustrated in FIG. 6, a route setting mechanism 301 may be connected instead of the output apparatus 104 so that the route setting mechanism 301 performs multicast packet routing on the nodes in the network 302 based on the multicast tree designed by the multicast tree design apparatus 300. Here, the multicast tree design apparatus 300 includes the multicast tree design apparatus 100 or 200 according to the first or second embodiment.

The functions of the multicast tree design apparatus according to the present invention may be not only achieved by hardware but also implemented by a computer and a program. The program is recorded and provided on a computer-readable recording medium such as a magnetic disk and a semiconductor memory. The program is read by the computer on such occasions as the startup of the computer, and controls the operation of the computer. The program thereby makes the computer function as the inputting unit 150, problem creating unit 160 or 260, problem solving unit 170, and outputting unit 180 in either of the foregoing embodiments, and perform the processing illustrated in FIG. 2 or 5.

A mathematical programming problem typically involves determining an extreme value of a linear objective function under constraints given by linear equations or inequalities. In the present embodiment, the constraint expressions in use are basically intended for constructing a plurality of routes that start from a source node and end at a plurality of destination nodes, and the objective function in use is for minimizing an evaluation index on the links or nodes that constitute the multicast tree. With the foregoing constraint expressions alone, however, the plurality of routes that start from the source node and end at the plurality of destination nodes will be included in the solution as respective independent routes.

Confluent routes can also be included in the solution. To reject such a solution, constraint expressions are added for superposing all the routes into a multicast tree and for preventing the plurality of routes from being superposed into a topology that causes a confluence of the routes. Consequently, a multicast tree can be designed by mathematical programming. The creation of the constraint expressions for constructing a plurality of routes that start from the source node and end at the respective destination nodes makes it possible to impose independent constrains and perform optimization on each individual route.

According to the present embodiment, the multicast tree is designed by mathematical programming. This eliminates the need for developing complicated algorithms for respective optimization purposes as with a multicast tree design apparatus that is based on Dijkstra's algorithm.

According to the present embodiment, the mathematical programming problem is solved with consideration given to the plurality of routes that start from the source node and end at the respective destination nodes. Unlike the methods of solving a multicast tree by mathematical programming without regard to such routes, it is therefore possible to impose independent constraints and perform optimization on each individual route.

The present application is based on Japanese Patent Application No. 2007-111456 (filed on Apr. 20, 2007), and claims a priority according to the Paris Convention based on the Japanese Patent Application No. 2007-111456. A disclosed content of the Japanese Patent Application No. 2007-111456 is incorporated in the specification of the present application by reference to the Japanese Patent Application No. 2007-111456.

The typical embodiments of the present invention have been described in detail. However, it should be understood that various changes, substitutions, and alternatives can be made without departure from the spirit and scope of the invention defined in the claims. Moreover, the inventor contemplates that an equivalent range of the claimed invention is kept even if the claims are amended in proceedings of the application.

Industrial Applicability

The present invention may be applied to designing a multicast tree for transferring a packet from a source node to a plurality of destination nodes on a network that includes nodes and links.

Reference Signs List

| | |
|---|---|
| 100, 200, 300: | multicast tree design apparatus |
| 110: | data processing apparatus |
| 120: | storage apparatus |
| 121: | various parameters |
| 122: | mathematical programming problem |
| 123: | solution |
| 130: | input apparatus |
| 140: | output apparatus |
| 150: | inputting unit |
| 160, 260: | problem creating unit |
| 161: | multiple route constraint creating unit |
| 162: | tree constraint creating unit |
| 163: | confluence constraint creating unit |
| 164: | objective function creating unit |
| 170: | problem solving unit |
| 180: | outputting unit |
| 261: | turn-back constraint creating unit |
| 262: | do-branch constraint creating unit |

-continued

Reference Signs List

| | |
|---|---|
| 263: | no-branch constraint creating unit |
| 301: | route setting mechanism |
| 302: | network |

The invention claimed is:

1. A multicast tree design apparatus for designing a multicast tree for transferring a packet from a source node to a plurality of destination nodes on a network that includes nodes and links connecting the nodes, the apparatus comprising:
 a problem creating unit; and
 a problem solving unit,
 wherein the problem creating unit includes:
  a multiple route constraint creating unit for creating first constraint expressions for constructing a plurality of routes that start from a source node and end at a plurality of destination nodes, said first constraint expressions being used for a mathematical programming problem;
  a tree constraint creating unit for creating second constraint expressions for superposing all the routes to construct a multicast tree, said second constraint expressions being used for the mathematical programming problem;
  a confluence constraint creating unit for creating third constraint expressions for preventing the plurality of routes from being superposed into a topology that causes a confluence of the routes, said third constraint expressions being used for the mathematical programming problem; and
  an objective function creating unit for creating an objective function for minimizing an evaluation index pertaining to the links or the nodes that constitute the multicast tree, said objective function being used for the mathematical programming problem, and
 wherein the problem solving unit solves the mathematical programming problem including the first, second, and third constraint expressions and the objective function created by the problem creating unit to determine a set of links that constitute the multicast tree.

2. The multicast tree design apparatus according to claim 1, wherein the first constraint expressions for constructing a plurality of routes that start from a source node and end at a plurality of destination nodes include a constraint expression that a route that starts from the source node and ends at each destination node passes through only one of links that are directly connected to the source node, a constraint expression that a route that starts from the source node and ends at each destination node passes through only one of links that are directly connected to the destination node and none of links that start from the destination node, and a constraint expression that, for each of the destination nodes, there is always a link that starts from a node if the route enters that node, and there is always no link that starts from a node if the route does not enter that node,
 wherein the second constraint expressions for superposing all the routes into a multicast tree include constraint expressions that a 0-1 variable $x_{i,j}$, which indicates if there is any route that passes through a link from node i to node j when the routes are superposed, needs to be created so that the total number of routes that start from the source node, end at the destination nodes, and pass through the link from node i to node j satisfies being less than or equal to $Zx_{i,j}$ (Z is the number of the destination nodes and an integer greater than zero) and being greater than or equal to $x_{i,j}$, wherein the third constraint expression for preventing the plurality of routes from being superposed into a topology that causes a confluence of the routes includes a constraint expression that, for each node i, a set of all links that end at the node i includes at most one of the links of the multicast tree, and wherein x is one of one and zero, and each of i and j stands for an integer greater than zero.

3. The multicast tree design apparatus according to claim 1, wherein the objective function includes any of functions for determining a total sum of delays of the respective routes that start from the source node and end at the plurality of destination nodes, a total number of links that constitute the multicast tree, and a maximum value of reciprocals of bandwidths of respective links on the plurality of routes that start from the source node and end at the plurality of destination nodes.

4. The multicast tree design apparatus according to claim 1, wherein the problem creating unit further includes a turn-back constraint creating unit for creating a constraint expression for preventing the routes from turning back to and passing through a node that has already been passed.

5. The multicast tree design apparatus according to claim 4, wherein the constraint expression for preventing the routes from turning back to and passing through a node that has already been passed includes a constraint expression that, for each of the links that constitute the multicast tree, a link leading from node i to node j and a link leading from node j to node i do not exist simultaneously, wherein each of i and j stands for an integer greater than zero.

6. The multicast tree design apparatus according to claim 1, wherein the problem creating unit further includes a do-branch constraint creating unit for creating a constraint expression for ensuring that the multicast tree branches at one or more of the nodes.

7. The multicast tree design apparatus according to claim 6, wherein the constraint expression for ensuring that the multicast tree branches at one or more of the nodes includes a constraint expression that the multicast tree always branches at every node included in a set of nodes.

8. The multicast tree design apparatus according to claim 6, wherein the constraint expression for ensuring that the multicast tree branches at one or more of the nodes includes a constraint expression that the multicast tree always branches at least one of nodes included in a set of nodes.

9. The multicast tree design apparatus according to claim 1, wherein the problem creating unit further includes a no-branch constraint creating unit for creating a constraint expression for preventing the multicast tree from branching at one or more of the nodes.

10. The multicast tree design apparatus according to claim 9, wherein the constraint expression for preventing the multicast tree from branching at one or more of the nodes includes a constraint expression that, for every node i included in a set of nodes, the number of links output from node i is always one if there is a link input to node i, wherein i stands for an integer greater than zero.

11. A multicast tree design method for designing a multicast tree for transferring a packet from a source node to a plurality of destination nodes on a network that includes nodes and links connecting the nodes, the method being carried out by an apparatus and comprising:

a problem creating first constraint expressions for constructing a plurality of routes that start from a source node and end at a plurality of destination nodes, as executed by a processing unit on a computer, said first constraint, expressions being used for a mathematical programming problem, second constraint expressions for superposing all the routes to construct a multicast tree, said second constraint expressions being used for the mathematical programming problem, third constraint expressions for preventing the plurality of routes from being superposed into a topology that causes a confluence of the routes, said third constraint expressions being used for the mathematical programming problem, and an objective function for minimizing an evaluation index pertaining to the links or the nodes that constitute the multicast tree, said objective function being used for the mathematical programming problem; and a problem solving the mathematical programming problem including the first, second and third constraint expressions and the objective function created by the problem creating to determine a set of links that constitute the multicast tree.

12. The multicast tree design method according to claim 11, wherein the first constraint expressions for constructing a plurality of routes that start from a source node and end at a plurality of destination nodes include a constraint expression that a route that starts from the source node and ends at each destination node passes through only one of links that are directly connected to the source node, a constraint expression that a route that starts from the source node and ends at each destination node passes through only one of links that are directly connected to the destination node and none of links that start from the destination node, and a constraint expression that, for each of the destination nodes, there is always a link that starts from a node if the route enters that node, and there is always no link that starts from a node if the route does not enter that node, wherein the second constraint expressions for superposing all the routes into a multicast tree include constraint expressions that a 0-1 variable $x_{i,j}$, which indicates if there is any route that passes through a link from node i to node j when the routes are superposed, needs to be created so that the total number of routes that start from the source node, end at the destination nodes, and pass through the link from node i to node j satisfies being less than or equal to $Zx_{i,j}$ (Z is the number of the destination nodes and an integer greater than zero) and being greater than or equal to $x_{i,j}$, wherein the constraint expression for preventing the plurality of routes from being superposed into a topology that causes a confluence of the routes includes a constraint expression that, for each node i, a set of all links that end at the node i includes at most one of the links of the multicast tree, and wherein x is one of one and zero, and each of i and i stands for an integer greater than zero.

13. The multicast tree design method according to claim 11, wherein the objective function includes any of functions for determining a total sum of delays of the respective routes that start from the source node and end at the plurality of destination nodes, a total number of links that constitute the multicast tree, and a maximum value of reciprocals of bandwidths of respective links on the plurality of routes that start from the source node and end at the plurality of destination nodes.

14. The multicast tree design method according to claim 11, wherein the problem creating further creates a constraint expression for preventing the routes from turning back to and passing through a node that has already been passed.

15. The multicast tree design method according to claim 14, wherein the constraint expression for preventing the routes from turning back to and passing through a node that has already been passed includes a constraint expression that, for each of the links that constitute the multicast tree, a link leading from node i to node j and a link leading from node j to node i do not exist simultaneously, and wherein each of i and j stands for an integer greater than zero.

16. The multicast tree design method according to claim 11, wherein the problem creating further creates a constraint expression for ensuring that the multicast tree branches at one or more of the nodes.

17. The multicast tree design method according to claim 16, wherein the constraint expression for ensuring that the multicast tree branches at one or more of the nodes includes a constraint expression that the multicast tree always branches at every node included in a set of nodes.

18. The multicast tree design method according to claim 16, wherein the constraint expression for ensuring that the multicast tree branches at one or more of the nodes includes a constraint expression that the multicast tree always branches at at least one of nodes included in a set of nodes.

19. The multicast tree design method according to claim 11, wherein the problem creating further creates a constraint expression for preventing the multicast tree from branching at one or more of the nodes.

20. The multicast tree design method according to claim 19, wherein the constraint expression for preventing the multicast tree from branching at one or more of the nodes includes a constraint expression that, for every node i included in a set of nodes, a number of links output from node i is always one if there is a link input to node j, wherein i stands for an integer greater than zero.

21. A non-transitory computer-readable medium embodying a program for designing, by using a computer, a multicast tree for transferring a packet from a source node to a plurality of destination nodes on a network that includes nodes and links connecting the nodes, the program comprising codes that, when executed, causes the computer to perform:

a problem creating first constraint expressions for constructing a plurality of routes that start from a source node and end at a plurality of destination nodes, said first constraint expressions being used for a mathematical programming problem, second constraint expressions for superposing all the routes to construct a multicast tree, said second constraint expressions being used for the mathematical programming problem, third constraint expressions for preventing the plurality of routes from being superposed into a topology that causes a confluence of the routes, said third constraint expressions being used for the mathematical programming problem, and an objective function for minimizing an evaluation index pertaining to the links or the nodes that constitute the multicast tree, said objective function being used for the mathematical programming problem; and a problem solving the mathematical programming problem including the first, second, and third constraint expressions and the objective function created by the problem creating to determine a set of links that constitute the multicast tree.

22. The non-transitory computer-readable medium according to claim 21, wherein the first constraint expressions for constructing a plurality of routes that start from a source node and end at a plurality of destination nodes include a constraint expression that a route that starts from the source node and ends at each destination node passes through only one of links that are directly connected to the source node, a constraint expression that a route that starts from the source node and ends at each destination node passes through only one of links that are directly connected to the destination node and none of links that start from the destination node, and a constraint expression that, for each of the destination nodes, there is always a link that starts from a node if the route enters that node, and there is always no link that starts from a node if the route does not enter that node, wherein the second constraint expressions for superposing all the routes into a multicast tree include constraint expressions that a 0-1 variable $x_{i,j}$, which indicates if there is any route that passes through a link from node i to node j when the routes are superposed, needs to be created so that the total number of routes that start from the source node, end at the destination nodes, and pass through the link from node i to node j satisfies being less than or equal to $Zx_{i,j}$ (Z is the number of the destination nodes and an integer greater than zero) and being greater than or equal to $x_{i,j}$, wherein the constraint expression for preventing the plurality of routes from being superposed into a topology that causes a confluence of the routes includes a constraint expression that, for each node i, a set of all links that end at the node i includes at most one of the links of the multicast tree, and wherein x is one of one and zero, and each of i and j stands for an integer greater than zero.

23. The non-transitory computer-readable medium according to claim 21, wherein the objective function includes any of functions for determining a total sum of delays of the respective routes that start from the source node and end at the plurality of destination nodes, a total number of links that constitute the multicast tree, and a maximum value of reciprocals of bandwidths of respective links on the plurality of routes that start from the source node and end at the plurality of destination nodes.

24. The non-transitory computer-readable medium according to claim 21, wherein the problem creating further creates a constraint expression for preventing the routes from turning back to and passing through a node that has already been passed.

25. The non-transitory computer-readable medium according to claim 24, wherein the constraint expression for preventing the routes from turning back to and passing through a node that has already been passed includes a constraint expression that, for each of the links that constitute the multicast tree, a link leading from node i to node j and a link leading from node j to node i do not exist simultaneously, and wherein each of i and j stands for an integer greater than zero.

26. The non-transitory computer-readable medium according to claim 21, wherein the problem creating further creates a constraint expression for ensuring that the multicast tree branches at one or more of the nodes.

27. The non-transitory computer-readable medium according to claim 26, wherein the constraint expression for ensuring that the multicast tree branches at one or more of the nodes includes a constraint expression that the multicast tree always branches at every node included in a set of nodes.

28. The non-transitory computer-readable medium according to claim 26, wherein the constraint expression for ensuring that the multicast tree branches at one or more of the nodes includes a constraint expression that the multicast tree always branches at at least one of nodes included in a set of nodes.

29. The non-transitory computer-readable medium according to claim 21, wherein the problem creating further creates a constraint expression for preventing the multicast tree from branching at one or more of the nodes.

30. The non-transitory computer-readable medium according to claim 29, wherein the constraint expression for preventing the multicast tree from branching at one or more of the nodes includes a constraint expression that, for every node i included in a set of nodes, a number of links output from node i is always one if there is a link input to node i, and wherein i stands for an integer greater than zero.

* * * * *